United States Patent
Jansing et al.

[11] Patent Number: 5,939,219
[45] Date of Patent: Aug. 17, 1999

[54] HIGH-TEMPERATURE FUEL CELL HAVING AT LEAST ONE ELECTRICALLY INSULATING COVERING AND METHOD FOR PRODUCING A HIGH-TEMPERATURE FUEL CELL

[75] Inventors: Thomas Jansing, Nürnberg; Jens Decker, Rheinbreitbach, both of Germany

[73] Assignee: Siemens Aktiengesellschaft, Munich, Germany

[21] Appl. No.: 09/059,102

[22] Filed: Apr. 13, 1998

Related U.S. Application Data

[63] Continuation of application No. PCT/DE96/01931, Oct. 9, 1996.

[30] Foreign Application Priority Data

Oct. 12, 1995 [DE] Germany .............................. 195 38 034

[51] Int. Cl.⁶ .................................................. H01M 8/12
[52] U.S. Cl. .............................. 429/32; 429/35; 427/115; 427/419.3; 427/427
[58] Field of Search ........................ 429/32, 35; 427/115, 427/419.3, 427

[56] References Cited

U.S. PATENT DOCUMENTS

| | | | |
|---|---|---|---|
| 3,460,971 | 8/1969 | Bonis et al. ...................... | 427/419.3 X |
| 3,730,766 | 5/1973 | Nishimatsu et al. .............. | 427/419.3 X |
| 4,774,150 | 9/1988 | Amano et al. .................... | 427/419.3 X |
| 4,857,420 | 8/1989 | Maricle et al. ...................... | 427/115 X |
| 5,151,334 | 9/1992 | Fushimi et al. ............................ | 429/32 |
| 5,338,577 | 8/1994 | Burdette ............................... | 427/427 X |
| 5,385,792 | 1/1995 | Shiratori et al. .......................... | 429/32 |

FOREIGN PATENT DOCUMENTS

| | | |
|---|---|---|
| 0426265 A2 | 5/1991 | European Pat. Off. . |
| 0642185 A2 | 3/1995 | European Pat. Off. . |

OTHER PUBLICATIONS

PCT WO 96/17394 (Jansing, T. et al.), dated Jun. 6, 1996.
PCT WO 94/10717 (Pal, U. et al.), dated May 11, 1994.
Japanese Patent Abstract JP 61–101965 A (Urushibata, H.), dated May 20, 1986.
Japanese Patent Abstract JP 1.003966 (Kodama, Y. et al.) dated Sep. 1, 1989.
Japanese Patent Abstract 63–289771 (Urushibata, H.), dated Nov. 28, 1988.
Japanese Patent Abstract 02–295068 (Maruyama, S.), dated Dec. 5, 1990.
Publication in Siemens Power Journal Apr. 1994 "Material for Solid–Oxide High–Temperature Fuel Cells" pp. 36–38, (Drenckhahn, W. et al.).

*Primary Examiner*—Stephen Kalafut
*Attorney, Agent, or Firm*—Herbert L. Lerner; Laurence A. Greenberg

[57] ABSTRACT

A high-temperature fuel cell has at least one electrically insulating covering. The electrically insulating covering contains at least two layers which are disposed one on top of the other and are each formed of an electrically insulating ceramic material. The composition of the ceramic material of one layer is different from the composition of the ceramic material of the other layer. This results in optimization of the insulation characteristic and the adhesion of the electrically insulating covering. A method is also provided for producing a high-temperature fuel cell having at least one electrically insulating covering.

10 Claims, 1 Drawing Sheet

5,939,219

HIGH-TEMPERATURE FUEL CELL HAVING AT LEAST ONE ELECTRICALLY INSULATING COVERING AND METHOD FOR PRODUCING A HIGH-TEMPERATURE FUEL CELL

CROSS-REFERENCE TO RELATED APPLICATION

This application is a continuation of International Application Ser. No. PCT/DE96/01931, filed Oct. 9, 1996, which designated the United States.

BACKGROUND OF THE INVENTION

Field of the Invention

The invention relates to a high-temperature fuel cell having at least one electrically insulating covering, as well as to a method for producing a high-temperature fuel cell.

It is known that live metallic components connected to one another in high-temperature fuel cells must be partially electrically insulated from one another. It is particularly difficult to satisfy that requirement in the case of a high operating temperature, for example an operating temperature of more than 800° C. Frequently, an integral material connection between the metallic components can be produced only with a glass-like substance, for example with glass or glass solder, due to specific boundary conditions. However, such a glass-like substance is normally relatively highly electrically conductive at a high operating temperature and is consequently a poor electrical insulator.

Furthermore, those glass-like substances have the characteristic of decomposing when an electrical voltage is applied to them. That decomposition may take place even at a voltage of considerably less than 1 volt.

A report entitled "Materials for Solid-Oxide High-Temperature Fuel Cells" by W. Drenckhahn et al., in Siemens Power Journal, Issue 4, Year 94, pages 36 to 38, in particular, discloses the application of an electrical potential of, for example, 0.7 volts operating voltage to 1.3 volts quiescent voltage between two bipolar plates in high-temperature fuel cells. Even at those electrical voltages, decomposition reactions occur between the bipolar plates as a result of electrolysis, if a glass-like substance is used, that is to say ion migration takes place from one electrode side to the other. In the process, the intrinsic strength of the glass-like substance is adversely affected even after a short time, as a result of which the probability of a malfunction occurring is in turn considerably increased.

In order to avoid that disadvantage, the bipolar plate is provided with an additional single-layer covering of stabilized $ZrO_2$ which, depending on the requirement or the structure, has a thickness of between, for example, 30 $\mu$m and 150 $\mu$m. Optionally, for better adhesion of the covering on the bipolar plate, a so-called adhesion promoter composed of metal or ceramic is applied to the bipolar plate to improve the adhesion of the covering on the bipolar plate. The $ZrO_2$ material that is used in general is partially or fully stabilized using known technical stabilization components such as $Y_2O_3$, CaO, MgO, $Al_2O_3$ or $CeO_2$.

That single-layer covering has inadequate electrical insulation which is required especially if a glass-like substance is used to join the metallic components together, since the glass-like substance is a poor electrical insulator.

U.S. Pat. No. 5,338,577 discloses a method for coating a metallic substrate with ceramic through the use of flame spraying, wherein an intermediate covering of steel is sprayed on initially, followed by a covering of yttrium-stabilized $ZrO_2$ and finally an $Al_2O_3$ covering.

Furthermore, Japanese Published, Non-prosecuted Patent Application No. 06-144 971 discloses a covering body which includes a ceramic substrate, adhesion promoter coverings of steel, a ceramic covering, and possibly an outer covering to close the pores, wherein the adhesion promoter coverings and the ceramic covering are produced through the use of flame spraying, and the outer covering is produced through the use of a sol-gel technique.

In addition, US Statutory Invention Registration H 12 60 discloses a method for producing covering bodies for high-temperature fuel cells through the use of a plasma spray process. However, in the case of that process, only a single electrically insulating covering, composed of yttrium-stabilized $ZrO_2$, is sprayed on.

SUMMARY OF THE INVENTION

It is accordingly an object of the invention to provide a high-temperature fuel cell having at least one electrically insulating covering and a method for producing a high-temperature fuel cell, which overcome the hereinafore-mentioned disadvantages of the heretofore-known devices and methods of this general type and in which one of the coverings provides electrical insulation that is as complete as possible, adheres well and is mechanically robust.

With the foregoing and other objects in view there is provided, in accordance with the invention, a high-temperature fuel cell, comprising two bipolar plates; and at least one electrically insulating covering disposed between the two bipolar plates, the electrically insulating covering containing at least two layers disposed one on top of the other, the at least two layers each formed of an electrically insulating ceramic material, and the ceramic material of one of the at least two layers having a different composition than the ceramic material of the other of the at least two layers.

With the objects of the invention in view, there is also provided, in a method for producing a high-temperature fuel cell having at least one electrically insulating covering disposed between two bipolar plates, the improvement which comprises producing the at least one electrically insulating covering from at least two layers disposed one on top of the other, each of the layers formed of an electrically insulating ceramic material, and the ceramic material of one of the at least two layers having a different composition than the ceramic material of the other of the at least two layers; producing the individual ceramic layers successively by spraying a ceramic; and applying the individual ceramic layers to a component.

The use of a plurality of electrically insulating ceramic layers in an electrically insulating covering has the advantage of satisfying the various requirements for electrical insulation and adhesion of different ceramic layers separately, since these differing requirements cannot be satisfied in a single ceramic layer. Electrical insulation and good adhesion characteristics are thus satisfied by a plurality of ceramic layers of different composition within a covering. The electrically insulating covering thus includes at least a first layer having good adhesion characteristics, that is to say the linear coefficient of expansion of the first layer differs only slightly from the linear coefficient of expansion of that component to which the first layer is applied, and a second layer which is disposed on the first layer and is characterized by good electrical insulation.

In accordance with another feature of the invention, the at least two layers are composed of the same electrically insulating ceramic material, and are separated from one another by at least one layer composed of a different electrically insulating ceramic material. As is known from the prior art, a single ceramic layer is not sufficient for adequately good electrical insulation. Since the covering thickness of a ceramic layer cannot be increased indefinitely due to the intrinsic mechanical stresses that occur, an electrically insulating covering having a plurality of ceramic layers, is used. In this case, covering thicknesses of, for example, 500 μm are achieved without the intrinsic stress in the covering being increased, since the covering is composed of a plurality of ceramic layers. This leads to considerable mechanical stabilization of the overall high-temperature fuel cell.

In accordance with a further feature of the invention, an adhesion promoter is used for application of the electrically insulating covering to a component of the high-temperature fuel cell. The adhesion promoter additionally ensures good adhesion of the electrically insulating covering on the component of the high-temperature fuel cell on which the electrically insulating covering is applied.

In accordance with an added feature of the invention, there is provided a layer for closing and healing pores and cracks in the last ceramic layer applied to the electrically insulating covering.

In accordance with another mode of the invention, the electrically insulating covering is produced by atmospheric plasma spraying, flame spraying, high-speed flame spraying, vacuum flame spraying or low-pressure flame spraying. The use of different spraying processes allows the respectively desired ceramic covering to be produced in different external conditions.

In accordance with a further mode of the invention, there is provided a layer applied to the electrically insulating covering through the use of a sol gel for closing and healing the pores and cracks in the last ceramic layer. If a glass-like substance, for example glass solder, is applied to the last ceramic layer in a further process then, for electrical insulation, it is of major importance that the last ceramic layer of the electrically insulating coating be sealed well. If the porosity within the last ceramic layer is too high, the glass-like substance penetrates into this layer, and reduces the electrical insulation.

In accordance with a concomitant mode of the invention, the sol gel is vacuum-infiltrated after application. The vacuum infiltration, which may also be carried out actually during the application process, ensures that the cracks and pores are closed and healed.

Other features which are considered as characteristic for the invention are set forth in the appended claims.

Although the invention is illustrated and described herein as embodied in a high-temperature fuel cell having at least one electrically insulating covering and a method for producing a high-temperature fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
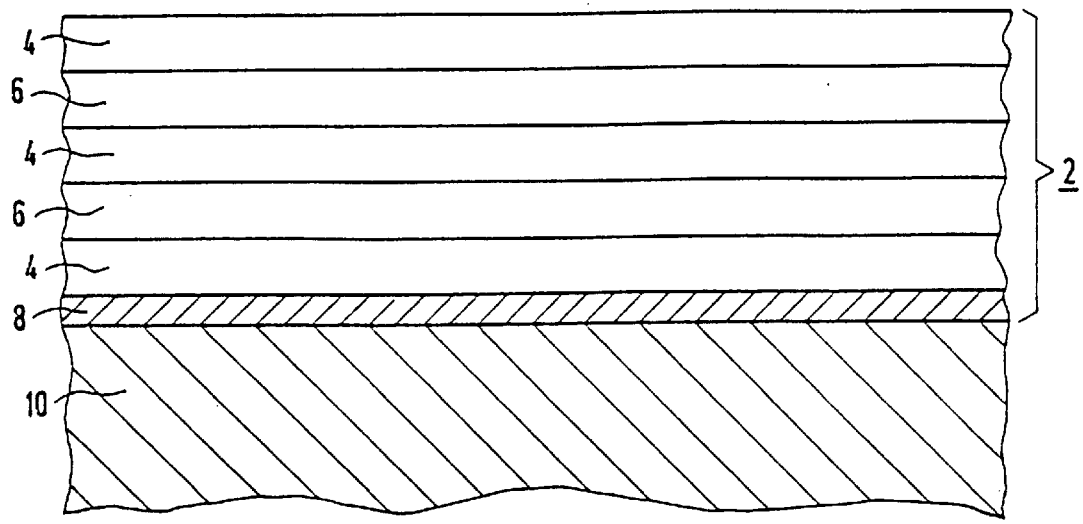
FIGS. 1 and 2 are fragmentary, diagrammatic, sectional views of a high-temperature fuel cell.

Referring now to the figures of the drawings in detail and first, particularly, to FIG. 1 thereof, there is seen a portion of a high-temperature fuel cell which includes a component 10, for example a bipolar plate, and an electrically insulating covering 2. In this case the electrically insulating covering 2 is disposed on the component 10 and the electrically insulating covering 2 contains a plurality of layers 4, 6 which are disposed one on top of the other and are each composed of an electrically insulating ceramic material. The composition of the ceramic material in the layers 4 is different from the composition of the ceramic material in the other layers 6.

In this configuration, in each case two layers 4 composed of the same electrically insulating ceramic material are separated from one another by a layer 6 composed of a different electrically insulating ceramic material.

In a first step, an adhesion promoter 8 is applied to the component 10. In this case, the component 10 is composed of a metal, a metal alloy or a ceramic. $CrFe5Y_2O_31$ is used, for example, as the metal in the high-temperature fuel cell. Other special alloys, such as Haynes Alloy 230, Inconel 600 or conventional industrial stainless steels are likewise often used.

The ceramic layer 4 which is composed, for example, of $ZrO_2$ is sprayed onto the adhesion promoter 8, and the linear coefficient of thermal expansion of the ceramic layer 4 is matched to that of the component 10. The ceramic layer 4 is applied directly to the adhesion promoter 8 by the spraying process. The ceramic layer 4 thus adheres well to the component 10, but is not suitable for ensuring good electrical insulation at the same time.

In a further step, the ceramic layer 6 is applied to the ceramic layer 4. The ceramic layer 6 has better electrical insulation characteristic than that of the ceramic layer 4. If $ZrO_2$ is used in the ceramic layer 4, then high-purity $Al_2O_3$ is suitable, for example, for the ceramic layer 6. The $Al_2O_3$ may be produced, for example, from fused corundum spinels, for example $MgAl_2O_4$, from mullites or from some other electrically insulating ceramic. As a rule, these ceramics do not have linear coefficients of thermal expansion similar to that of the component 10, so that they only poorly adhere to the component 10 without using the ceramic layer 4. A succession of different ceramic layers 4, 6 thus has the advantage of satisfying different requirements, such as electrical insulation and linear coefficient of thermal expansion, separately with different layers 4, 6. The ceramic layer 4 ensures good adhesion, while the ceramic layer 6 provides good electrical insulation. In order to provide adequate electrical insulation, the ceramic layer 6 then has to have a thickness which cannot be achieved in a single layer, since if the thicknesses are too great, considerable mechanical intrinsic stresses occur which lead to destabilization of the overall high-temperature fuel cell. In consequence, a plurality of layers 4, 6 are applied one on top of the other for adequate electrical insulation, until the total thickness of the electrically insulating covering 2 is sufficient for electrical insulation.

The spraying of the individual ceramic layers 4, 6 may be carried out, for example, by atmospheric plasma spraying, flame spraying, high-speed flame spraying, vacuum flame spraying or low-pressure flame spraying. The use of different spraying methods makes it possible to produce any desired ceramic layer 4, 6 with the desired characteristics.

Figure 2:
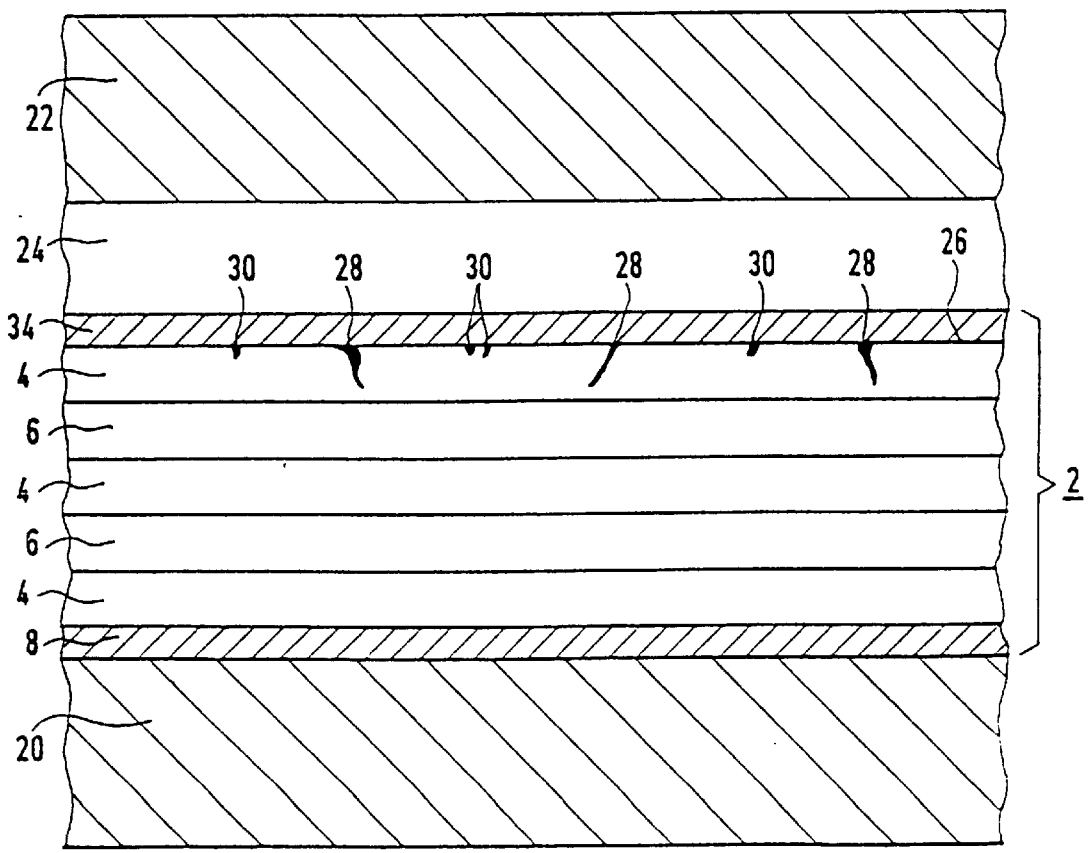

As is shown in a portion of a high-temperature fuel cell in FIG. 2, the electrically insulating covering 2 is disposed between two bipolar plates 20 and 22. The high-temperature fuel cell normally operates at an operating temperature of more than 800° C. In this case, the two bipolar plates 20, 22 can be connected with an integral material joint by only using a glass-like substance. A covering 24 of a glass-like substance is therefore disposed between the bipolar plate 22 and the electrically insulating covering 2. Such a glass-like substance may, for example, be a glass solder.

Since the covering 24 of a glass-like substance is in contact with the ceramic layer 4 that was applied last in the electrically insulating covering 2, the sealing of this ceramic layer 4 is of major importance for the electrical insulation. The use of spraying for production, results in cracks 28 and pores 30 being formed in a surface 26 of the ceramic layer 4, and they may have a negative effect on the electrical insulation characteristic since, for example, glass solder from the covering 24 may penetrate into the cracks 28 and the pores 30. That problem is solved by applying a layer 34 onto the last ceramic layer 4 in order to close and heal the cracks 28 and pores 30. This layer 34 is disposed between the last ceramic layer 4 and the covering 24 composed of a glass-like substance.

An application of an aqueous sol gel which is used as the layer 34 and is composed of $Al(OH)_3$, for example, that later dehydrates to form $Al_2O_3$, or a sol gel composed of $MgAl_2O_4$ components, allows the cracks 28 and the pores 30 in the surface 26 of the ceramic layer 4 to be closed and healed. In the case of this method, the aqueous sol gel is first of all applied onto the surface 26 of the last ceramic layer 4 by spraying through the use of compressed air or electrical atomization, by screen printing, by brushing, by sponging or by dipping. In a further step of the method, the sol gel in the layer 34 is introduced into the cracks 28 and the pores 30 by vacuum filtration. Once the method has been completed, a closed smooth surface 26 is thus obtained, into which the glass solder in the covering 24 no longer penetrates.

Typical sealers, which are added to the sol gel, are used and are based on epoxy resins and silicone resins. In the case of the high-temperature fuel cell, an aluminum oxide hydroxide sol with 86 to 96% aluminum oxide hydroxide hydrate and 4 to 14% aluminum acetate hydrate are infiltrated into a sprayed covering of ceroxide-stabilized zircon oxide and/or a covering of aluminum oxide. In this case the infiltration can also be carried out at room temperature and, optionally, at reduced pressure.

The electrically insulating covering 2 is thus excellently suited for use in a high-temperature fuel cell due to its electrical insulation and chemical robustness. Gas-carrying ducts and cavities which are integrated in the electrically insulating covering 2 in this case can be sealed off from one another well.

We claim:

1. A high-temperature fuel cell, comprising:

two bipolar plates; and at least one electrically insulating covering disposed between said two bipolar plates, said electrically insulating covering containing at least two layers formed of the same electrically insulating ceramic material, and at least one layer composed of a different electrically insulating ceramic material separating said at least two layers formed of the same electrically insulating material from one another, said at least two layers of the same electrically insulating ceramic material and said at least one layer of the different insulating material disposed one on top of each other.

2. A high-temperature fuel cell, comprising:

two bipolar plates;

at least one electrically insulating covering disposed between said two bipolar plates, said electrically insulating covering containing at least two layers disposed one on top of the other, said at least two layers each formed of an electrically insulating ceramic material, and said ceramic material of one of said at least two layers having a different composition than said ceramic material of the other of said at least two layers; and an adhesion promoter applying said electrically insulating covering to one of said bipolar plates in the form of a component.

3. A high-temperature fuel cell, comprising:

two bipolar plates;

at least one electrically insulating covering disposed between said two bipolar plates, said electrically insulating covering containing at least two layers disposed one on top of the other, said at least two layers each formed of an electrically insulating ceramic material, and said ceramic material of one of said at least two layers having a different composition than said ceramic material of the other of said at least two layers; and a layer applied onto said electrically insulating covering for closing and healing pores and cracks in a last one of said ceramic layers applied onto said electrically insulating covering.

4. In a method for producing a high-temperature fuel cell having at least one electrically insulating covering disposed between two bipolar plates, the improvement which comprises:

producing the at least one electrically insulating covering from at least two layers disposed one on top of the other, each of the layers formed by successively spraying an electrically insulating ceramic material, and the ceramic material of one of the at least two layers having a different composition than the ceramic material of the other of the at least two layers; and applying the individual ceramic layers to a component.

5. The method according to claim 4, which comprises performing the step of producing the electrically insulating covering by atmospheric plasma spraying.

6. The method according to claim 4, which comprises performing the step of producing the electrically insulating covering by flame spraying.

7. The method according to claim 4, which comprises performing the step of producing the electrically insulating covering by high-speed of flame spraying.

8. The method according to claim 4, which comprises performing the step of producing the electrically insulating covering by vacuum flame spraying.

9. The method according to claim 4, which comprises applying a layer by a sol gel onto the electrically insulating covering for closing and healing pores and cracks in a last one of the ceramic layers.

10. The method according to claim 9, which comprises vacuum-infiltrating the sol gel after application.

* * * * *